United States Patent [19]

Waite

[11] 4,008,767
[45] Feb. 22, 1977

[54] OIL RECOVERY BY LOW TENSION WATERFLOODING

[75] Inventor: Jerry M. Waite, Dallas, Tex.

[73] Assignee: Mobil Oil Corporation, New York, N.Y.

[22] Filed: Oct. 24, 1975

[21] Appl. No.: 625,785

[52] U.S. Cl. .................. 166/273; 166/274
[51] Int. Cl.² ........................ E21B 43/22
[58] Field of Search .......... 166/273, 274, 275

[56] References Cited

UNITED STATES PATENTS

| | | | |
|---|---|---|---|
| 3,175,610 | 3/1965 | Osoba | 166/270 |
| 3,369,602 | 2/1968 | Fallgatter et al. | 166/273 |
| 3,371,710 | 3/1968 | Harvey et al. | 166/274 |
| 3,414,053 | 12/1968 | Treiber et al. | 166/273 |
| 3,477,508 | 11/1969 | Hurd | 166/273 |
| 3,580,337 | 5/1971 | Gogarty et al. | 166/274 |
| 3,788,399 | 1/1974 | Feuerbacher et al. | 166/273 |

*Primary Examiner*—Ernest R. Purser
*Attorney, Agent, or Firm*—C. A. Huggett; William D. Jackson

[57] ABSTRACT

Oil recovery by low tension waterflooding in which the common-ion effect is employed to suppress divalent metal ions in the low tension slug. A low tension slug comprising an aqueous medium containing an agent effective to reduce the oil-water interfacial tension is injected into a subterranean oil reservoir in order to displace oil therein to a production system. The low tension slug contains a salt having an anion in common with an alkaline earth metal salt which forms part of the reservoir rock material and which acts as a potential contributor of divalent ions to the slug. Thus where the reservoir rock contains calcium sulfate, sodium sulfate may be used in the low tension slug to suppress solubilization of the calcium sulfate into the low tension slug by the common-ion effect. The low tension slug may be preceded by a pretreatment slug also containing a salt having a common anion with an alkaline earth metal salt in the reservoir rock material.

4 Claims, No Drawings

OIL RECOVERY BY LOW TENSION WATERFLOODING

BACKGROUND OF THE INVENTION

This invention relates to the recovery of oil from subterranean oil reservoirs and more particularly to improved waterflooding operations involving the injection of an aqueous low tension slug in which the common ion effect is employed to suppress the divalent concentration thereof.

In the recovery of oil from oil-bearing reservoirs, it usually is possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus it has been proposed to add surfactants to the injected water in order to lower the oil-water interfacial tension and/or to alter the wettability characteristics of the reservoir rock. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

Processes which involve the injection of aqueous surfactant solutions in order to reduce the oil-water interfacial tension are commonly referred to as low tension waterflooding techniques. To date one of the more promising low tension waterflooding techniques involves the injection of aqueous solutions of petroleum sulfonates within a designated equivalent weight range and under controlled conditions of salinity. For example, in a paper by W. R. Foster entitled "A Low-Tension Waterflooding Process", JOURNAL OF PETROLEUM TECHNOLOGY, Vol. 25, Feb. 1973, pp. 205–210, there is disclosed a low tension waterflood process which involves the sequential injection of a protective slug to displace reservoir waters, a surfactant slug containing a petroleum sulfonate surfactant system, and a mobility control slug containing a suitable thickening agent. The surfactant slug contains sodium chloride in a concentration, typically about 1–2 weight percent, which will promote the desired low interfacial tension between the surfactant solution and the reservoir oil.

Another waterflooding procedure in which surfactants are formed in situ to reduce the oil-water interfacial tension involves alkaline waterflooding. In this procedure, an aqueous solution of an alkali metal or ammonium hydroxide or carbonate is injected in order to neutralize organic acids in the reservoir to produce the corresponding surfaceactive alkali metal or ammonium soaps. An improved alkaline waterflooding process is described in U.S. Pat. No. 3,927,716, issued Dec. 23, 1975 to Burdyn et al. In this process, an aqueous alkaline solution is employed in which the alkalinity and monovalent salt salinity are controlled in order to arrive at the desired low oil-water interfacial tension.

One problem encountered in low tension waterflooding techniques resides in the tendency of the surfactants to become adsorbed from solution onto the rock surfaces of the reservoir. To overcome this it has been proposed to employ inorganic sacrificial agents which decrease surfactant adsorption by satisfying adsorption sites within the reservoir. For example, as disclosed in the aforementioned Foster paper and also in U.S. Pat. No. 3,469,630 to Hurd et al., inorganic salt such as sodium tripolyphosphate and/or sodium carbonate may be employed to reduce surfactant adsorption. The sacrificial agents normally are injected into the reservoir in a pretreatment slug ahead of the surfactant slug and may also be included in the low tension slug itself.

The adverse effect of divalent alkaline earth metal ions in low tension waterflooding processes is widely recognized in the prior art. For example, in the processes disclosed in the aforementioned Foster paper and the Burdyn et al. patent, protective slugs may be employed to displace reservoir waters containing unacceptably high divalent metal ion concentrations ahead of the surfactant. U.S. Pat. No. 3,175,610 to Osoba recognizes that bivalent cations such as calcium and magnesium ions in the flooding solution have an adverse effect upon the ability of surface-active agents, whether formed in situ or added to the floodwater, to lower the interfacial tension. The Osoba patent teaches the use of mass action relationships to decrease divalent metal ion concentrations by initially flooding the formation with a solution that is higher in sodium chloride concentration than the formation water.

As noted previously, it is well known in the art to adjust the monovalent salt salinity of a low tension slug in order to arrive at the optimum low oil-water interfacial tension. While as a practical matter sodium chloride has usually been proposed for use in this regard, various other salts have also been suggested. For example, U.S. Pat. No. 3,373,808 to Patton discloses the use of ionizable sulfate compounds in combination with various surfactants including anionic surfactants such as petroleum sulfonates or nonionic surfactants such as polyoxyethylene-type surfactants. The ionizable sulfate compound may be employed in a slug injected ahead of the surfactant slug as well as in the surfactant slug. Patton specifically suggests the use of sodium sulfate and discloses experimental data showing that the lowering of interfacial tension achieved by the addition of sodium sulfate is greater than that obtained by the addition of sodium chloride in concentration ranges up to about 4.5 weight percent.

Yet another process in which salts other than sodium chloride may be employed in conjunction with surfactant waterflooding is disclosed in U.S. Pat. No. 3,369,602 to Fallgatter et al. This patent, while indicating that sodium chloride is generally preferred for economic reasons, suggests that salts such as sodium citrate, sodium sulfate, sodium phosphate, sodium silicate, sodium carbonate, sodium borate, as well as various other salts such as aluminum chloride, ammonium chloride, magnesium sulfate and potassium carbonate, may be employed. In the Fallgatter et al. process, the salts may be injected either before or after the surfactant slug in a particular sequence which is said to increase oil recovery.

SUMMARY OF THE INVENTION

In accordance with the present invention, there is provided a new and improved low tension waterflooding process for use in subterranean oil reservoirs in which the rock material contains an alkaline earth metal salt which acts as a potential contributor of divalent metal ions to the injected water. More specifically the invention is applicable in reservoirs in which the rock material contains at least 0.5 weight percent calcium sulfate. In carrying out the present invention, an aqueous low tension slug is injected into the reservoir via a suitable injection system. The low tension slug comprises an aqueous medium containing an agent effective to reduce the interfacial tension between the injected water and the reservoir oil. In addition, the low tension slug contains a salt selected from the group consisting of alkali metal and ammonium sulfates in a concentration of at least 0.2 weight percent. Thus, this salt additive acts by the common-ion effect to suppress the contribution of alkaline earth metal ions to the injected aqueous medium. Subsequent to the injection of the low tension slug, a suitable aqueous flooding medium is then injected in order to displace the oil in the reservoir to a production system from which the oil is recovered.

DESCRIPTION OF SPECIFIC EMBODIMENTS

As noted previously, divalent metal ions such as calcium and magnesium ions which often are encountered in subterranean oil reservoirs deleteriously affect many of the surfactant systems proposed for use in low tension waterflooding. Thus, it is a conventional practice to precede the low tension slug by a pretreatment slug containing sodium chloride which may function to displace reservoir waters ahead of the surfactant slug and also to base-exchange the reservoir rock material to replace magnesium, calcium and other divalent metal ions with sodium ions. In addition, sodium chloride is conventionally used as a salinity control agent in the low tension slug in order to arrive at the optimum salinity conditions for low oil-water interfacial tensions.

While sodium chloride is effective for these purposes, its presence in some circumstances acts indirectly to increase the divalent metal ion concentration in the low tension slug. In this respect, many reservoir rocks contain significant quantities of alkaline earth metal salts which are slightly soluble in water and which may contribute divalent metal ions directly to the low tension slug. Calcium in the form of calcium sulfate or calcium carbonate normally will be the predominant alkaline earth metal although slightly soluble salts of barium and magnesium may also be present in the reservoir rock in minor amounts. Thus, the slightly soluble alkaline earth metal salts which are referred to herein as potential contributors of divalent metal ions to the low tension slug include calcium sulfate, and alkaline earth metal salts which are less soluble in water than calcium sulfate, specifically barium sulfate and the calcium, magnesium, and barium carbonates. Calcium sulfate exhibits a solubility in distilled water within the range of about 1.6 to 2.4 grams per liter depending upon the form (gypsum or anhydrite) and the temperature. The solubilities of the other alkaline earth metal sulfates and carbonates mentioned above are significantly less, ranging from about 0.0023 gram per liter for barium sulfate in distilled water to about 0.223 gram per liter for magnesium carbonate in distilled water.

As discussed in Chapter 3 of Ostroff, A. G., INTRODUCTION TO OILFIELD WATER TECHNOLOGY, Prentice-Hall, Inc., Englewood Cliffs, N. J., 1965, and more particularly pages 55–72 thereof, the presence in the water of a salt such as sodium chloride which does not contain a common ion with the alkaline earth metal salts has an effect on the solubilities of the aforementioned alkaline earth metal carbonates and sulfates. Thus, the divalent metal ions contributed from these materials are increased substantially in water containing sodium chloride or other alkali metal halides. For example, Ostroff in FIG. 3.7 at page 68 shows that the solubility of calcium sulfate increases from a value of about 2 grams per liter at zero sodium chloride concentration up to a value of about 6 grams per liter at a sodium chloride concentration of about 5 weight percent. The calcium sulfate solubility continues to increase with increasing sodium chloride concentration until it reaches a maximum of slightly in excess of 7 grams per liter at sodium chloride concentrations of about 12 to 15 weight percent. Similar relationships obtain for the other slightly soluble alkaline earth metal carbonates and sulfates. In this regard, reference is made to the discussions in Ostroff on the effects of sodium chloride concentration on calcium carbonate solubility at page 62, magnesium carbonate solubility at page 66, and barium sulfate solubility at page 71.

While the presence of sodium chloride acts to increase the solubility of the aforementioned alkaline earth metal salts, the presence of an alkali metal salt having a common anion with the water-soluble alkaline earth metal salt acting as a contributor of divalent ions functions to suppress the solubilization of the alkaline earth metal salt into water. This of course is a manifestation of the well-known common-ion effect. Thus in the case in which gypsum is present in the reservoir rock as a potential contributor of calcium ions to the low tension slug, the addition of sodium sulfate to the low tension slug increases the sulfate ion concentration, thus repressing the solubility of calcium sulfate, or if calcium ions are present, precipitating them as calcium sulfate. In the same manner where calcium carbonate is present in the rock material in significant amounts to act as a potential contributor of calcium ions, sodium carbonate may be added to the low tension slug.

The invention is applicable to low tension waterflooding in reservoirs containing significant quantities of the slightly water-soluble alkaline earth metal salts. As noted previously, calcium is the predominant alkaline earth metal found in sedimentary rock formations and the invention is particularly applicable to reservoirs in which the rock material contains calcium sulfate in an amount of at least 0.5 weight percent or calcium carbonate in an amount of at least 0.1 weight percent.

As noted previously, sodium chloride, normally used for salinity control in low tension waterflooding, tends to increase the leaching of the alkaline earth metal salt from the reservoir rock and thus presents a competitive reaction to the common-ion effect. Accordingly, the salt additive having a common anion with the alkaline earth metal salt should be the predominant inorganic salt in the low tension slug. In most cases it will be preferred to employ an aqueous medium in the low tension slug which is substantially free of sodium chloride and to adjust the monovalent salt solely with the common-anion salt additive.

The common-anion salt additive employed in carrying out the present invention normally will be sodium sulfate or sodium carbonate as the case may be since these salts are relatively inexpensive and usually readily available. However, the other alkali metal or ammonium sulfates and carbonates can be employed. Usually, the use of lithium carbonate should be avoided since its water solubility is relatively low. Preferably the salt additive is present in low tension slugs in a concentration of at least 0.2 weight percent in order to provide adequate sulfate or carbonate ions to suppress the solubilization of the calcium sulfate or carbonate. In many cases it will be desired to limit the salt additive concentration to a value no greater than 3 weight percent in order to provide a salinity consistent with the desired low oil-water interfacial tension. Thus, it is preferred to employ the common-anion salt in a concentration within the range of 0.2–3 weight percent.

As an example of the solubility relationships involved relative to the present invention, for a reservoir rock material containing 0.5 weight percent or more of calcium sulfate, injected water containing 0.3 weight percent pof sodium chloride will dissolve 3–5 grams of calcium sulfate per liter of water depending upon the form of calcium sulfate (anhydrite or gypsum) present. This corresponds to a calcium ion concentration of about 880–1470 parts per million. By employing at least 0.2 percent by weight of sodium sulfate in the injected water with no sodium chloride present, the calcium ion concentration in the injected water can be reduced to within the range of 410–470 parts per million. Similarly in a formation in which the rock material contains 0.1 weight percent or more of calcium carbonate, the calcium ion concentration in an injected brine solution containing 1–2 weight percent sodium chloride would be on the order of 500–600 parts per million compared to a calcium ion concentration of a few parts per million if the injected water contains at least 0.2 weight percent sodium carbonate and no sodium chloride. Even with sodium chloride present in a concentration of about 1 percent, the calcium ion concentration would be less than about 50 parts per million.

As noted previously, it is conventional practice in low tension water-flooding to inject a protective slug ahead of the low tension slug in order to provide a buffer between the low tension slug and the reservoir water. This practice may be employed in carrying out the present invention. However, in this case the protective slug should also contain a common-anion salt additive as described previously having a common anion with the water-soluble alkaline earth metal salt in the reservoir rock. The protective slug, like the surfactant slug, should contain the common-anion salt additive as the predominant inorganic salt and preferably be substantially free of sodium chloride since the objective here is to suppress the divalent metal ion concentration in the protective slug rather than to effect a base-exchange with the reservoir solids.

The interfacial tension agent employed in the low tension slug may take the form of surfactant compositions such as disclosed in the aforementioned patents and the paper by Foster or it may take the form of an alkaline agent which reacts with organic acids within the reservoir oil to form surface-active agents in situ as described in the aforementioned Burdyn et al. patent. In cases where some calcium ions will be present in the injected water notwithstanding the inclusion of the common-anion salt additives, surfactant systems which will tolerate some divalent ions may be employed. For example, U.S. Pat. No. 3,508,612 to Reisberg et al. discloses surfactant systems comprising a mixture of petroleum sulfonates and sulfated ethoxylated alcohols which are effective in the presence of about 400 parts per million calcium ions. In any case, it usually will be desired to employ the common-anion salt additive as the predominant salt for salinity control to arrive at the desired low interfacial tension.

Subsequent to injection of the low tension slug an aqueous flooding medium is then injected in order to displace the oil in the reservoir to the production wells. The aqueous flooding medium may be any suitable water such as field water which is readily available. If desired, a thickening agent may be employed for mobility control purposes. The thickening agent may be present in the low tension slug but usually will be added to a slug of water injected immediately after the low tension slug.

The present invention may be carried out utilizing injection and production systems as defined by any suitable arrangement of wells, as will be readily understood by those skilled in the art. Similarly, displacing fluids employed in the present invention may be injected in any suitable pore volume amounts. By the term "pore volume" is meant the pore volume of the reservoir underlying the well pattern defined by the wells comprising the injection and production systems as explained more fully in the aforementioned Burdyn et al. patent. With respect to the quantities of displacing fluids employed in the present invention, the protective slug if employed typically will be injected in an amount within the range of 0.05 to 0.2 pore volume. Thereafter the low tension slug is injected in an amount within the range of 0.1 to 0.5 pore volume. If a separate mobility control slug containing a polymeric thickening agent is employed, this may be injected immediately subsequent to the low tension slug in an amount within the range of 0.05 to 0.15 pore volume. Thereafter, additional water is injected as the driving fluid in an amount necessary to carry the displacement process to completion.

I claim:

1. In the recovery of oil from a subterranean oil reservoir penetrated by spaced injection and production systems and in which the rock material of said reservoir contains calcium sulfate in an amount of at least 0.5 weight percent of said rock material, the method comprising:
   a. introducing into said reservoir via said injection system a low tension slug comprising an aqueous medium containing an agent effective to reduce the interfacial tension between said aqueous medium and said reservoir oil, said low tension slug containing a salt additive selected from the group consisting of alkali metal and ammonium sulfates in a concentration of at least 0.2 weight percent to suppress the solubilization of said calcium sulfate into said low tension slug by the common-ion effect,
   b. thereafter introducing into said reservoir via said injection system an aqueous flooding medium to displace oil to said production system, and
   c. recovering oil from said production system.

2. The method of claim 1 wherein said low tension slug is substantially free of sodium chloride.

3. The method of claim 1 wherein said salt additive is present in said low tension slug in a concentration within the range of 0.2–3 weight percent.

4. The method of claim 1 further comprising the step of, prior to step (a), introducing into said reservoir via said injection system a protective slug comprising an aqueous medium containing a salt additive selected from the group consisting of alkali metal and ammonium sulfates in a concentration of at least 0.2 weight percent.

* * * * *